United States Patent
Yamada et al.

(10) Patent No.: US 7,752,527 B2
(45) Date of Patent: Jul. 6, 2010

(54) MICROCONTROLLER AND RAM

(75) Inventors: Hiromichi Yamada, Hitachi (JP);
Teppei Hirotsu, Hitachi (JP); Teruaki Sakata, Hitachi (JP); Takeshi Kataoka, Tokyo (JP); Shunichi Iwata, Kodaira (JP)

(73) Assignee: Renesas Technology Corp., Tokyo (JP)

( * ) Notice: Subject to any disclaimer, the term of this patent is extended or adjusted under 35 U.S.C. 154(b) by 888 days.

(21) Appl. No.: 11/604,806

(22) Filed: Nov. 28, 2006

(65) Prior Publication Data

US 2007/0124559 A1     May 31, 2007

(30) Foreign Application Priority Data

Nov. 28, 2005   (JP)  ............... 2005-342282

(51) Int. Cl.
*G11C 29/00*     (2006.01)

(52) U.S. Cl. ...................... 714/773; 714/763

(58) Field of Classification Search ............... 714/773, 714/763
See application file for complete search history.

(56) References Cited

U.S. PATENT DOCUMENTS

| | | | | |
|---|---|---|---|---|
| 4,755,974 | A * | 7/1988 | Yamada et al. ............. | 365/49.1 |
| 5,043,943 | A * | 8/1991 | Crisp et al. ............. | 365/189.16 |
| 5,111,427 | A * | 5/1992 | Kobayashi et al. ...... | 365/185.07 |
| 5,233,610 | A * | 8/1993 | Nakayama et al. .......... | 714/704 |
| 5,245,617 | A * | 9/1993 | DeSouza et al. ............. | 714/766 |
| 5,757,817 | A * | 5/1998 | Bolyn et al. ................. | 714/719 |
| 5,796,758 | A * | 8/1998 | Levitan ....................... | 714/800 |
| 5,959,796 | A * | 9/1999 | Matsumi et al. ............... | 360/48 |
| 6,597,595 | B1 * | 7/2003 | Ichiriu et al. .............. | 365/49.18 |
| 6,690,595 | B1 * | 2/2004 | Srinivasan et al. ....... | 365/49.17 |

FOREIGN PATENT DOCUMENTS

| | | |
|---|---|---|
| JP | 05-088989 | 4/1993 |
| JP | 09-288619 | 11/1997 |

* cited by examiner

*Primary Examiner*—M. Mujtaba K Chaudry
(74) *Attorney, Agent, or Firm*—Antonelli, Terry, Stout & Kraus, LLP.

(57) ABSTRACT

A microcontroller in which an increase in hardware is suppressed and data correction capability for software error of RAM can be improved is provided. A microcontroller which performs processing according to a program includes a CPU and a RAM for storing data processed by the CPU, wherein multiplexed regions are defined in the RAM, and when these regions are accessed, an access to an address outputted by the CPU and a copy access to an address obtained by adding or subtracting a certain value to or from the address outputted by the CPU are performed. By this means, the same data can be stored in a plurality of regions and the reliability can be improved.

19 Claims, 9 Drawing Sheets

FIG. 3A
WRITING DATA TO MULTIPLEXED REGION (COPY SOURCE)

FIG. 3B
WRITING DATA TO MULTIPLEXED REGION (COPY DESTINATION)

FIG. 3C
WRITING DATA TO NON-MULTIPLEXED REGION

READING DATA FROM MULTIPLEXED REGION (COPY SOURCE)

FIG. 5B

READING DATA FROM MULTIPLEXED REGION (COPY DESTINATION)

FIG. 5C

READING DATA FROM NON-MULTIPLEXED REGION

MICROCONTROLLER AND RAM

CROSS-REFERENCE TO RELATED APPLICATION

The present application claims priority from Japanese Patent Application No. JP 2005-342282 filed on Nov. 28, 2005, the content of which is hereby incorporated by reference into this application.

TECHNICAL FIELD OF THE INVENTION

The present invention relates to a microcontroller. More particularly, it relates to a technology effectively applied to a microcontroller for use in control apparatus requiring high reliability.

BACKGROUND OF THE INVENTION

The microcontroller is a device that is embedded in apparatus such as home electronics, audiovisual products, cellular phones, automobiles, and industrial machines, and it controls such apparatus by performing processing according to a program stored in a memory.

Because of the nature of the microcontroller embedded in apparatus for use, it is required to have necessary performance to control the apparatus as well as to be inexpensive. Further, the microcontroller is strongly required to be reliable enough to properly operate under an operating condition where operation is guaranteed.

Since the apparatus control has become more and more complicated and sophisticated in recent years, the amount of data processed by CPU has been increased, and capacity of the RAM embedded in the microcontroller has been also increased. On the other hand, miniaturization of the fabrication process and reductions in power supply voltage of the microcontroller have caused soft errors in which the charge of a memory device is temporarily inverted due to the influence from neutron radiation or the like. In particular, the RAM is more susceptible to a soft error than other devices due to its fineness. The data stored in the RAM contains important data that directly affects the control of the apparatus. Therefore, it is desirable to make the RAM less susceptible to the soft error.

ECC (Error Correcting Code) has been used as a technology for improving the reliability of RAM (for example, Japanese Patent Application Laid-Open Publication No. 9-288619 (Patent Document 1) and Japanese Patent Application Laid-Open Publication No. 5-88989 (Patent Document 2). ECC is a technology where, by adding a check bit to original data and then storing the data with the check bit, the original correct data can be restored when a one-bit error occurs, and when a two-bit error occurs, the original data cannot be restored but the occurrence of the error can be detected. In some apparatus required to have highly reliable data such as communications apparatus, the mirroring process where the RAM is multiplexed to store the same data in the plurality of RAMs, and data values are checked when the data is read is automatically performed by hardware.

SUMMARY OF THE INVENTION

Incidentally, of the above-mentioned conventional diagnostic technologies, ECC is an effective technology and widely used at the present time. However, it cannot correct an error of two bits or more. In the mirroring process, since the same data is stored in a plurality of RAMs, the possibility that the same data becomes erroneous simultaneously in the plurality of RAMs is extremely low. Therefore, the probability that erroneous data can be corrected seems to be drastically enhanced by combining the mirroring process with ECC. However, it is difficult to apply such a combination to a microcontroller, which is required to be inexpensive.

Therefore, an object of the invention is to provide a microcomputer capable of improving the data correction capability to the soft error in a RAM while restraining the increase in hardware.

The above and other objects and novel characteristics of the present invention will be apparent from the description of this specification and the accompanying drawings.

The typical ones of the inventions disclosed in this application will be briefly described as follows.

According to the present invention, the microcontroller for performing processing according to a program comprises: a CPU; and RAM for storing data processed by the CPU, wherein multiplexed regions are defined in the RAM, and when accessing the multiplexed regions, an access to an address outputted by the CPU and a copy access to an address obtained by adding or subtracting a certain value to or from the address outputted by the CPU are performed. Consequently, a microcontroller capable of storing the same data in a plurality of regions to improve the reliability can be provided.

Accordingly, by placing data requiring reliability in the multiplexed regions of the RAM without multiplexing the RAM, a copy is automatically created at the time of writing, and error detection and correction using the copy are performed at the time of reading.

The effects obtained by typical aspects of the present invention will be briefly described below.

According to the present invention, a capacity required to store high-reliability data can be set as multiplexed regions in the RAM, and the probability that data becomes erroneous can be reduced by storing the same data in the plurality of regions. Therefore, it is possible to improve the reliability.

DESCRIPTIONS OF THE PREFERRED EMBODIMENTS

Hereinafter, embodiments of the present invention will be described in detail with reference to the accompanying drawings. Note that components having the same function are denoted by the same reference symbols throughout the drawings for describing the embodiment, and the repetitive description thereof will be omitted.

First Embodiment

Figure 1:
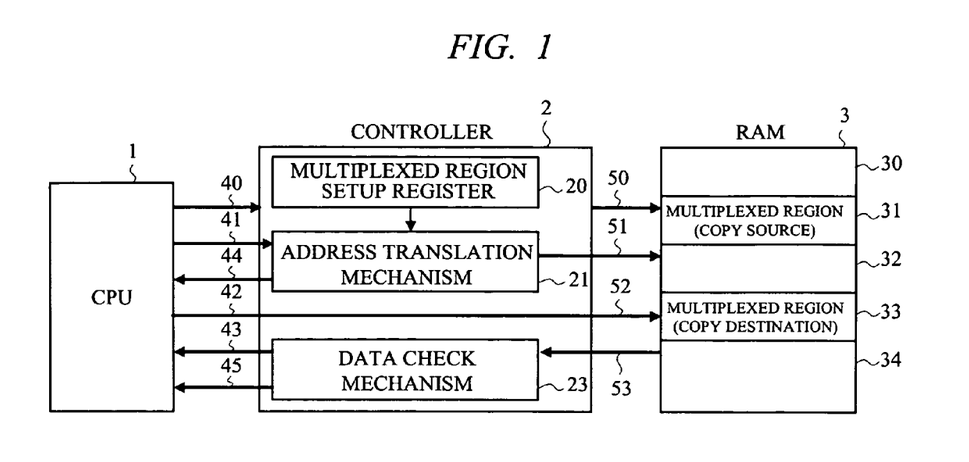
FIG. 1 is a diagram showing a configuration of a microcontroller according to a first embodiment of the present invention.

FIG. 1 is a diagram showing an example of a configuration of the microcontroller according to a first embodiment of the present invention. In the first embodiment, as shown in FIG. 1, the RAM that has no error detecting/correcting functions is used and the copy source and the corresponding copy destination are provided as multiplexed regions in the RAM, thereby making it possible to perform the error detection. The microcontroller according to the first embodiment includes a CPU 1, a controller 2, and a RAM 3.

The CPU 1 accesses the RAM 3 via the controller 2. The RAM 3 is divided into the multiplexed region (copy source) 31, the multiplexed region (copy destination) 33, regions other than the multiplexed regions (hereinafter referred to as "non-multiplexed region") 30, 32, and 34. The multiplexed region (copy source) 31 and the multiplexed region (copy destination) 33 have an identical capacity. When the CPU 1 accesses the multiplexed region (copy source) 31, it also accesses the multiplexed region (copy destination) 33. When the CPU 1 accesses any of the non-multiplexed regions 30, 32, and 34, it accesses only the address of the non-multiplexed region. Since the multiplexed region (copy destination) 33 is a copy of the multiplexed region (copy source) 31, it is not assumed that the CPU 1 directly accesses the multiplexed region 33. To prevent the CPU 1 from accessing the multiplexed region 33, some methods are considered including the method where the multiplexed region 33 is made inaccessible by hardware to make it an access prohibited region or the method where it is made inaccessible by hardware only at the time of reading.

Next, interface signals between the CPU 1 and the controller 2 will be described. A reference numeral 40 denotes an access command of the CPU 1 and has information of idle (no access), reading, writing, access size, and the like. A reference numeral 41 denotes an address of the CPU 1, a reference numeral 42 denotes data to be written, and a reference numeral 43 denotes read data. A reference numeral 44 denotes a bus wait signal that is used to extend the access by the CPU 1 when the access cannot be completed in one cycle. A reference numeral 45 denotes an error signal that is outputted when read data of the CPU 1 is erroneous.

The controller 2 controls reading and writing of data from and to the RAM 3 when the CPU 1 accesses the RAM 3. A multiplexed region setup register 20 is a register that sets up the multiplexed region (copy source) 31 and the multiplexed region (copy destination) 33 in the RAM 3. The setup is performed by the CPU 1. An address translation mechanism 21 translates an address 41 of the CPU 1 into a RAM address 51. When the CPU 1 accesses the multiplexed region (copy source) 31 of the RAM 3, the address 41 of the CPU 1 is translated to the RAM address 51 to access the RAM 3, and then it is translated to the address of the multiplexed region (copy destination) 33 to access the RAM 3. When any of the non-multiplexed regions 30, 32, and 34 is accessed, the CPU address 41 is directly outputted. When reading data from the multiplexed regions of the RAM 3, a data check mechanism 23 checks a value of the multiplexed region (copy source) 31 and a value of the multiplexed region (copy destination) 33 against each other.

Next, interface signals between the controller 2 and the RAM 3 will be described. A reference numeral 50 denotes an access command to the RAM 3, a reference numeral 51 denotes an address, a reference numeral 52 denotes data to be written, and a reference numeral 53 denotes read data.

Figure 2:
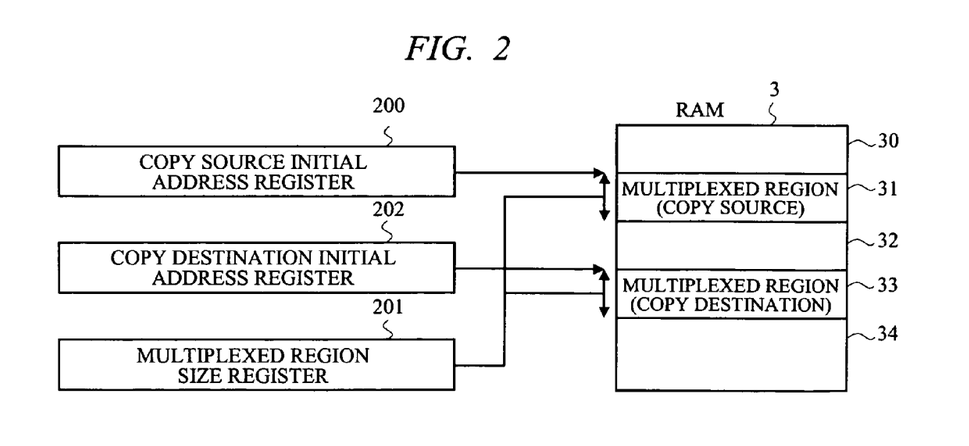
FIG. 2 is a diagram showing a method of setting multiplexed regions in the RAM shown in FIG. 1.

FIG. 2 is a diagram showing a method of setting up the multiplexed regions in the RAM 3 shown in FIG. 1. The multiplexed region setup register 20 of the controller 2 includes a copy source initial address register 200, a multiplexed region size register 201, and a copy destination initial address register 202. FIG. 2 shows an aspect in which the three registers specify the multiplexed regions 31 and 33 of the RAM 3. The copy source initial address register 200 indicates an initial address of the multiplexed region (copy source) 31. The copy destination initial address register 202 indicates an initial address of the multiplexed region (copy destination) 33. The multiplexed region size register 201 represents the capacities of the multiplexed regions 31 and 33.

Note that a method other than that shown in FIG. 2 can be used as a multiplexed region setup method. For example, the multiplexed regions can be set by using the initial address of the multiplexed region (copy source) 31, the sizes of the multiplexed regions 31 and 33, and a distance (difference in address) between the multiplexed region (copy source) 31 and the multiplexed region (copy destination) 33. It is also possible to have plural sets of multiplexed regions. This configuration can be achieved by providing plural sets of the multiplexed region setup registers 200, 201, and 202 shown in FIG. 2.

Figure 3A:
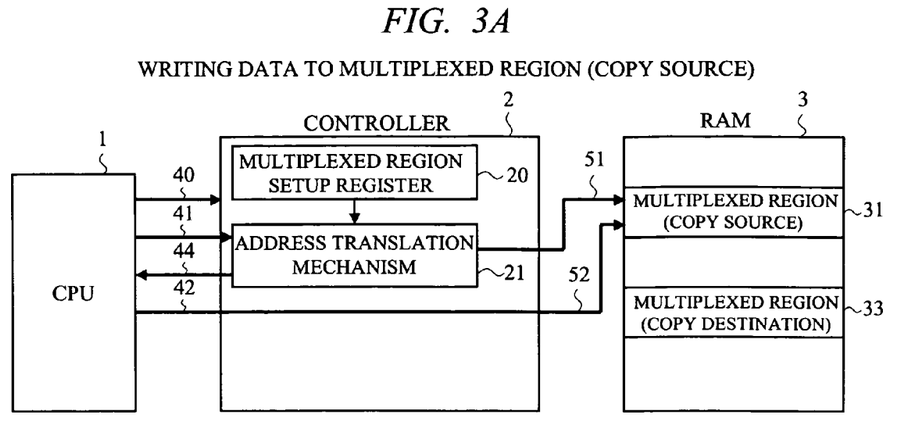
FIG. 3A is a diagram showing writing of data from a CPU to the RAM shown in FIG. 1.
Figure 3B:
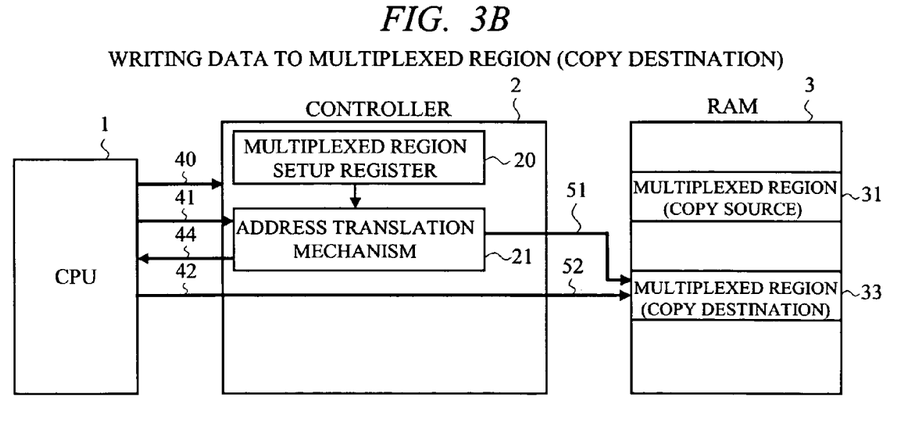
FIG. 3B is a diagram showing writing of data from a CPU to the RAM shown in FIG. 1.
Figure 3C:
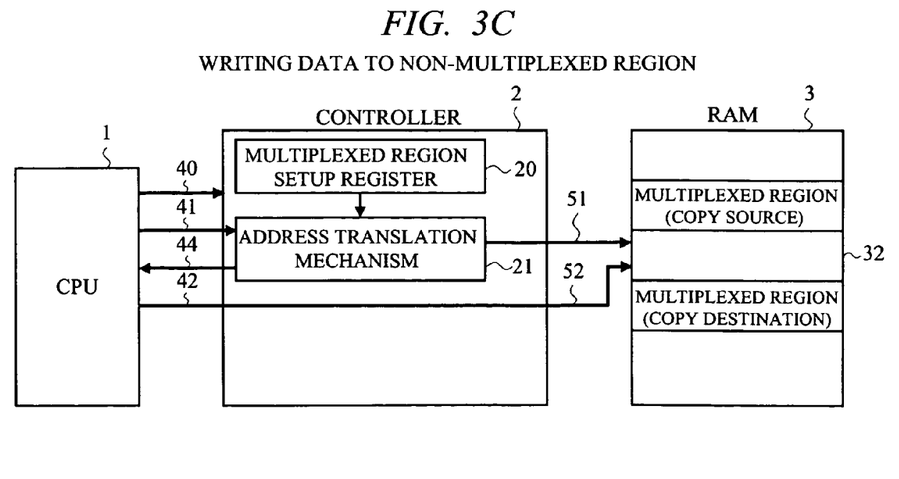
FIG. 3C is a diagram showing writing of data from a CPU to the RAM shown in FIG. 1.

FIG. 3A to FIG. 3C are diagrams showing writing of data from the CPU 1 to the RAM 3 shown in FIG. 1. FIG. 3A and FIG. 3B show writing of data to the multiplexed regions, and FIG. 3C shows writing of data to the non-multiplexed region.

In FIG. 3A, the CPU 1 is writing data to the multiplexed region of the RAM 3, and the address translation mechanism 21 outputs the address 41 of the CPU 1 directly to the RAM address 51. Also, since writing of data to the multiplexed region (copy destination) 33 is performed in the next cycle, a bus wait (bus wait signal) 44 is outputted to the CPU 1. The controller 2 outputs write data 42 outputted from the CPU 1 to the RAM write data 52 and writes it to the multiplexed region (copy source) 31.

FIG. 3B shows a state in which the bus wait 44 of the previous cycle makes the writing by the CPU 1 wait and the data is being written to the multiplexed region (copy destination) 33 of the RAM 3. Since the access to the multiplexed region (copy destination) is completed in this cycle, the bus wait 44 is not outputted. The controller 2 outputs the write data 42 outputted from the CPU 1 to the RAM write data 52 to write it in the multiplexed region (copy destination) 33.

In FIG. 3C, the CPU 1 is writing data to the non-multiplexed region 32 of the RAM 3, and the address translation mechanism 21 outputs the address 41 of the CPU 1 directly to the RAM address 51. Also, since the writing is completed in this cycle, the bus wait 44 is not outputted.

Figure 4:
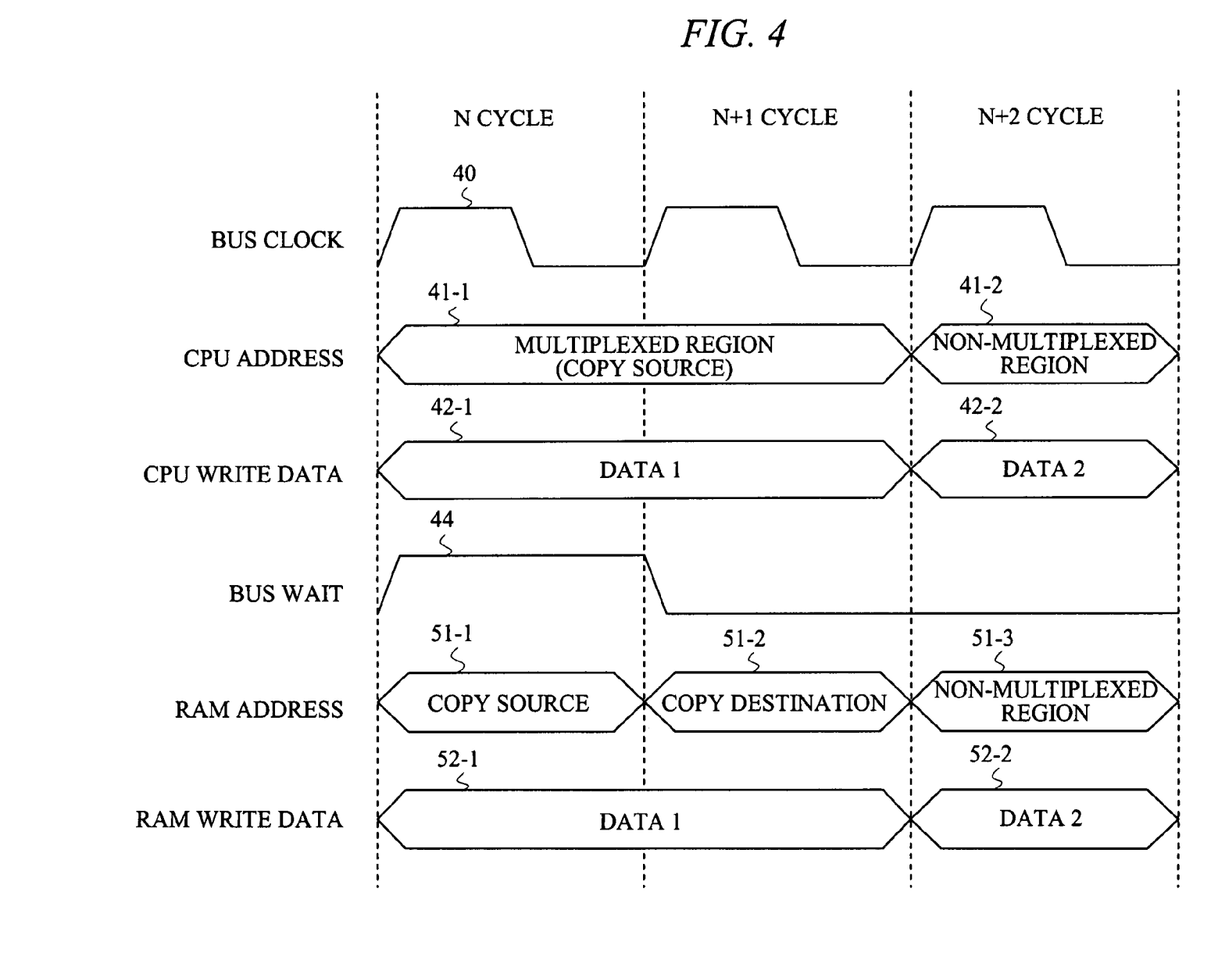
FIG. 4 is a time chart showing the writing of data to the regions (multiplexed region (copy source), multiplexed region (copy destination), and non-multiplexed region) of the RAM described with reference to FIG. 3A to FIG. 3C.

FIG. 4 is a time chart showing the writing of data to the respective regions (multiplexed region (copy source), multiplexed region (copy destination), and non-multiplexed region) of the RAM 3 described with reference to FIG. 3A to FIG. 3C. An N cycle and an N+1 cycle are cycles in which data is written to the multiplexed regions, and an N+2 cycle is a cycle in which data is written to the non-multiplexed region. When the multiplexed region (copy destination) is to be accessed in the next cycle, the bus wait 44 is outputted (in the N cycle). The bus wait 44 makes the access of the CPU 1 wait and the data is written to the multiplexed region (copy destination) (in the N+1 cycle).

Figure 5A:
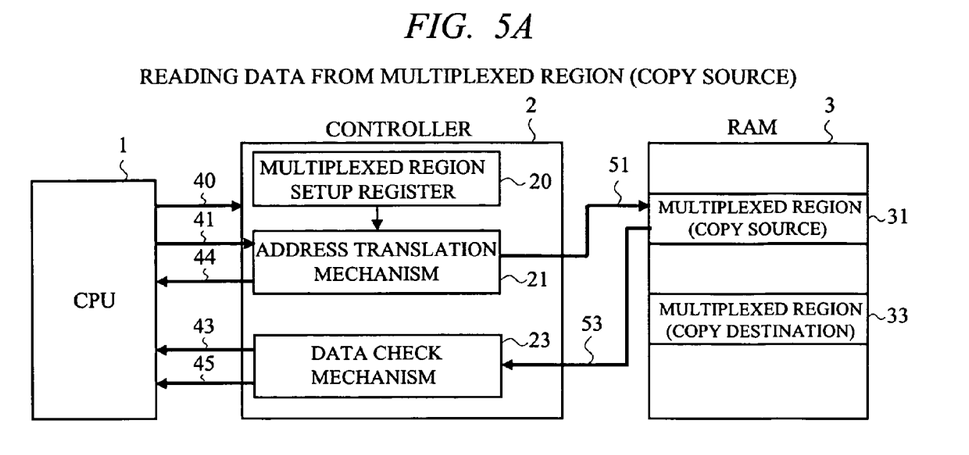
FIG. 5A is a diagram showing reading of data from the RAM to the CPU shown in FIG. 1.
Figure 5B:
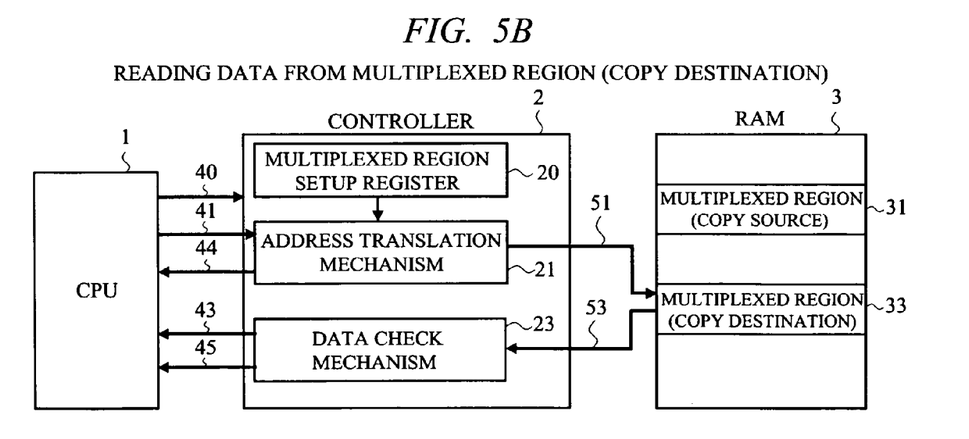
FIG. 5B is a diagram showing reading of data from the RAM to the CPU shown in FIG. 1.
Figure 5C:
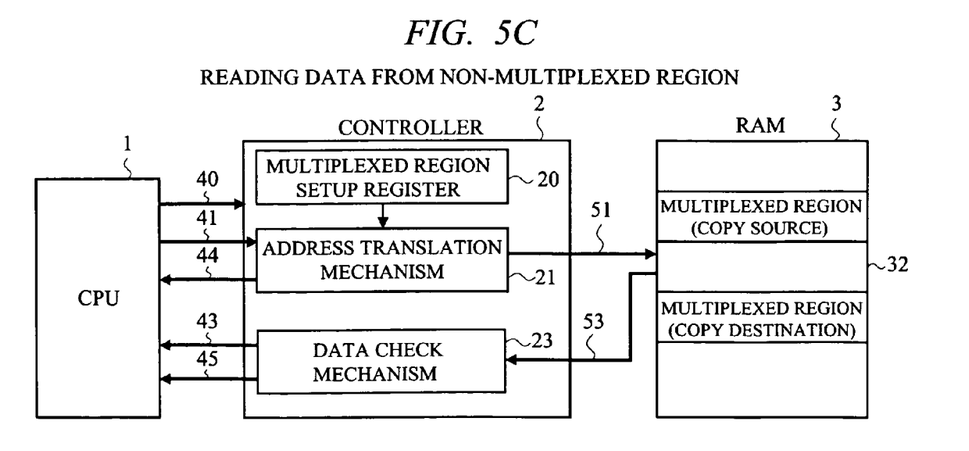
FIG. 5C is a diagram showing reading of data from the RAM to the CPU shown in FIG. 1.

FIG. 5A to FIG. 5C are diagrams showing reading of data from the RAM 3 by the CPU 1 shown in FIG. 1. FIG. 5A and FIG. 5B show reading of data from the multiplexed regions, and FIG. 5C shows reading of data from the non-multiplexed region.

In FIG. 5A, the CPU 1 is reading data from the multiplexed region of the RAM 3, and the address translation mechanism 21 outputs the address 41 of the CPU 1 directly to the RAM address 51. Also, since the reading of the data from the multiplexed region (copy destination) 33 is performed in the next cycle, the bus wait 44 is outputted to the CPU 1. The data check mechanism 23 stores data 53 read from the multiplexed region (copy source) 31 in an internal buffer. Read data 43 to the CPU 1 is not determined in this cycle.

FIG. 5B shows a state in which the bus wait 44 of the previous cycle makes the reading by the CPU 1 wait and the data is being read from the multiplexed region (copy destination) 33 of the RAM 3. Since the access to the multiplexed region (copy destination) is completed in this cycle, the bus wait 44 is not outputted. The data check mechanism 23 compares the read data 53 from the multiplexed region (copy destination) 33 with the data read from the multiplexed region (copy source) 31 in the previous cycle and stored in the buffer. If the former data matches the latter data, the data is outputted to the CPU 1 as read data 43 from the multiplexed region. If not, it is determined that the data in either multiplexed region is erroneous, and an error signal 45 is outputted.

In FIG. 5C, the CPU 1 is reading data from the non-multiplexed region 32 of the RAM 3, and the address translation mechanism 21 outputs the address 41 of the CPU 1 directly to the RAM address 51. Also, since the reading is completed in this cycle, the bus wait 44 is not outputted.

Figure 6:
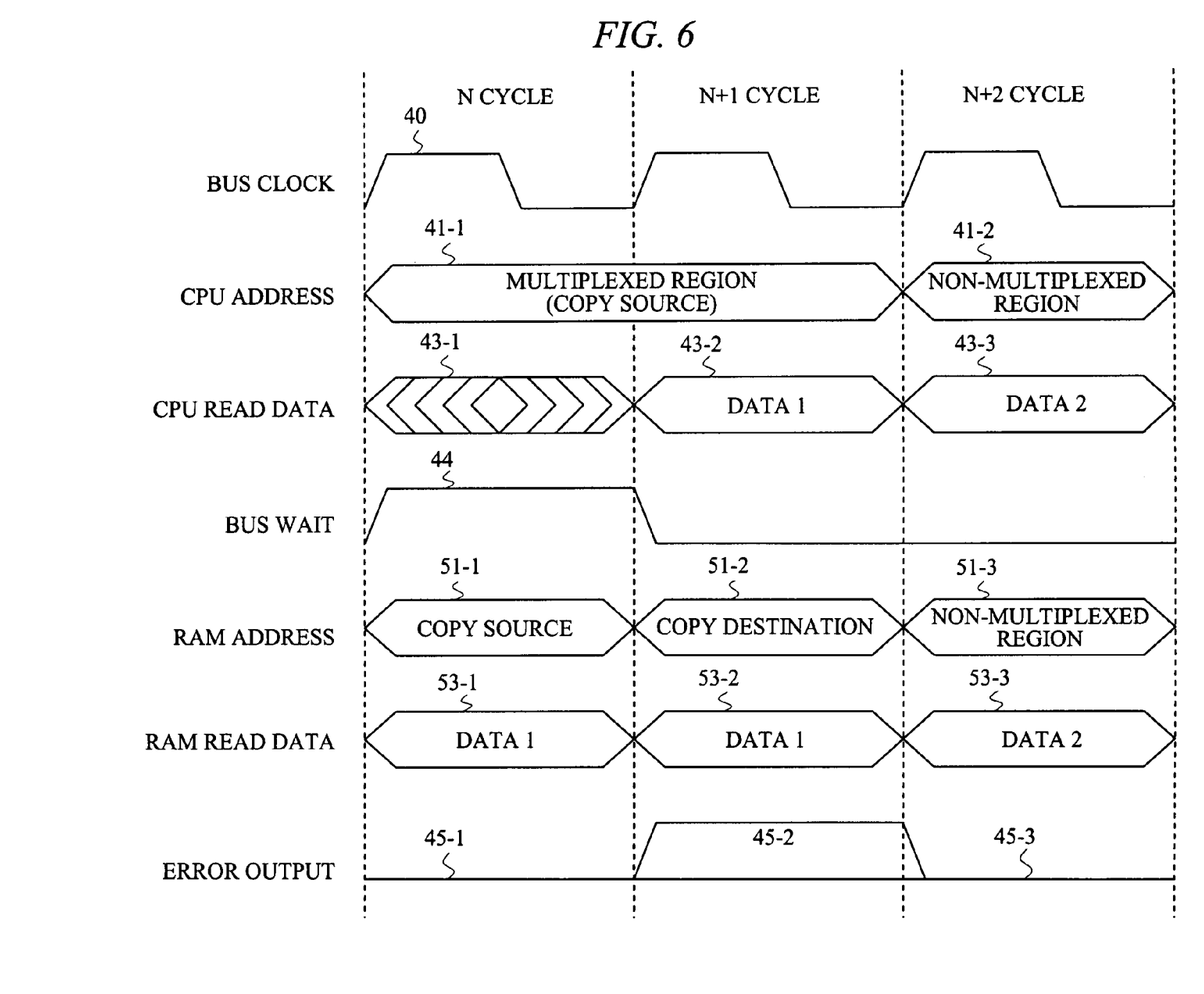
FIG. 6 is a time chart showing the reading of data from the regions (multiplexed region <copy source>, multiplexed region <copy destination>, and non-multiplexed region) of the RAM described with reference to FIG. 5A to FIG. 5C.

FIG. 6 is a time chart showing the reading of data from the respective regions (multiplexed region (copy source), multiplexed region (copy destination), and non-multiplexed region) of the RAM 3 described with reference to FIG. 5A to FIG. 5C. An N cycle and an N+1 cycle are cycles in which data is read from the multiplexed regions, and an N+2 cycle is a cycle in which data is read from the non-multiplexed region. When the multiplexed region (copy destination) is to be accessed in the next cycle, the bus wait 44 is outputted (in the N cycle). The bus wait 44 makes the access of the CPU 1 wait and the data is read from the multiplexed region (copy destination) (in the N+1 cycle). If the data read from the copy source does not match the data read from the copy destination, an error signal is outputted (45-2).

Figure 7:
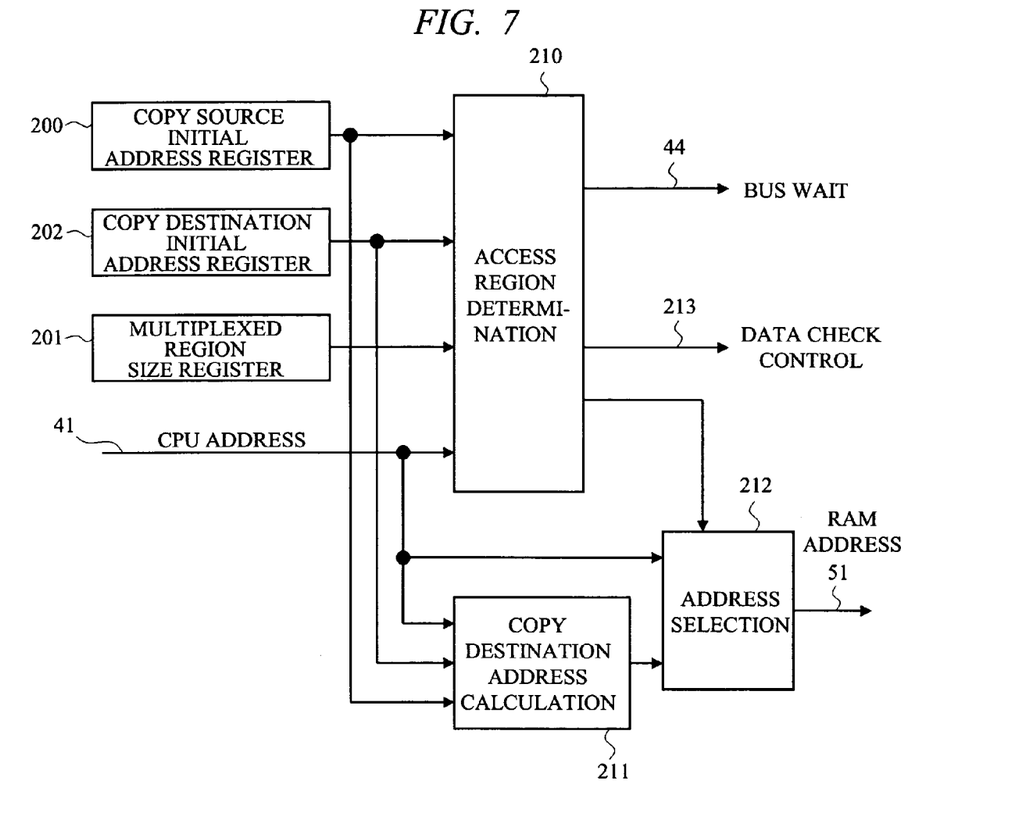
FIG. 7 is a diagram showing a configuration of an address translation mechanism shown in FIG. 1.

FIG. 7 is a diagram showing a configuration of the address translation mechanism 21 shown in FIG. 1. The copy source initial address register 200, the multiplexed region size register 201, the copy destination initial address register 202, and the CPU address 41 are inputted to an access region determining section 210 and it is determined whether the CPU address 41 is the multiplexed region (copy source) 31 of the RAM 3 shown in FIG. 1. The condition for the CPU address 41 to be the multiplexed region (copy source) 31 is expressed by the following formula 1.

$$\text{Multiplexed region initial address} \leq \text{CPU address} < \text{multiplexed region initial address} + \text{multiplexed region size} \quad \text{formula 1}$$

If the CPU address 41 is the multiplexed region (copy source) 31, the bus wait 44 is outputted to the CPU 1. Also, in the data check mechanism 23 shown in FIG. 1, a control signal 213 to compare the data of the multiplexed region (copy source) stored in the buffer with the data of the multiplexed region (copy destination) read from the RAM is outputted. The multiplexed region setup registers 200, 201, and 202 and the CPU address 41 are inputted to a copy destination address calculating section 211 to calculate a multiplexed region (copy destination) address. The multiplexed region (copy destination) address can be calculated by the following formula 2.

$$\text{Multiplexed region (copy destination) address} = \text{CPU address} + \text{copy destination initial address} - \text{copy source initial address} \quad \text{formula 2}$$

An address selecting section 212 receives the CPU address 41 and an output from the copy destination address calculating section 211, and it selects an address according to an instruction from the access region determining section 210.

Figure 8:
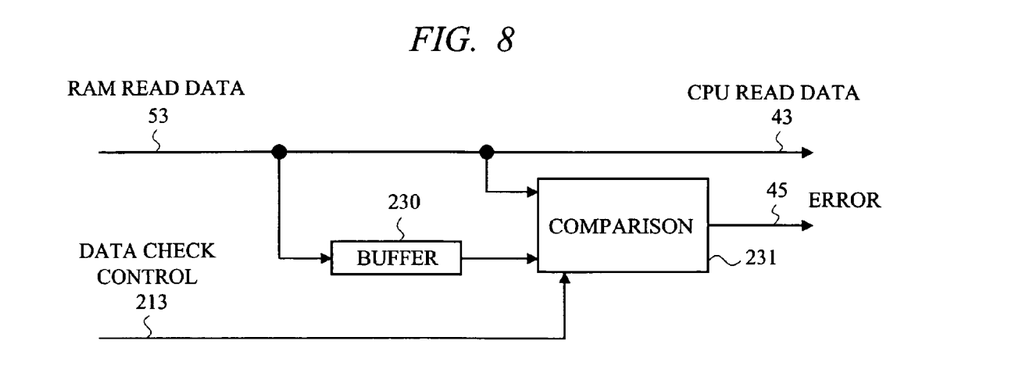
FIG. 8 is a diagram showing a configuration of a data check mechanism shown in FIG. 1.

FIG. 8 is a diagram showing a configuration of the data check mechanism 23 shown in FIG. 1. A reference numeral 230 denotes a buffer that stores the RAM read data 53. A comparator 231 compares the RAM read data 53 with the data stored in the buffer 230. The comparison is performed when a data check control signal 213 is enabled. The read data 53 from the multiplexed region (copy source) is stored in the buffer 230. The read data 53 from the multiplexed region (copy destination) and the data in the buffer 230 are compared in the comparator 231 in the next cycle. If the former data does not match the latter data, the error signal 45 is outputted.

As described above, according to the first embodiment, data requiring reliability is placed in the multiplexed regions of the RAM without multiplexing the RAM. Consequently, a copy of data is automatically created when the data is written, and error detection/correction (detection or correction by checking the source data and the copy data) is performed using the copy of data at the time of reading. In particular, by setting the multiplexed regions having a necessary capacity in the RAM and storing the same data in the multiplexed regions, even if data in one multiplexed region is affected by the soft error and cannot be corrected, the erroneous data can be corrected.

Accordingly, since a capacity required to store high-reliability data can be set as multiplexed regions in the RAM and the same data can be stored in the plurality of regions, the possibility that data becomes erroneous can be reduced and thus the reliability can be improved.

Second Embodiment

Figure 9:
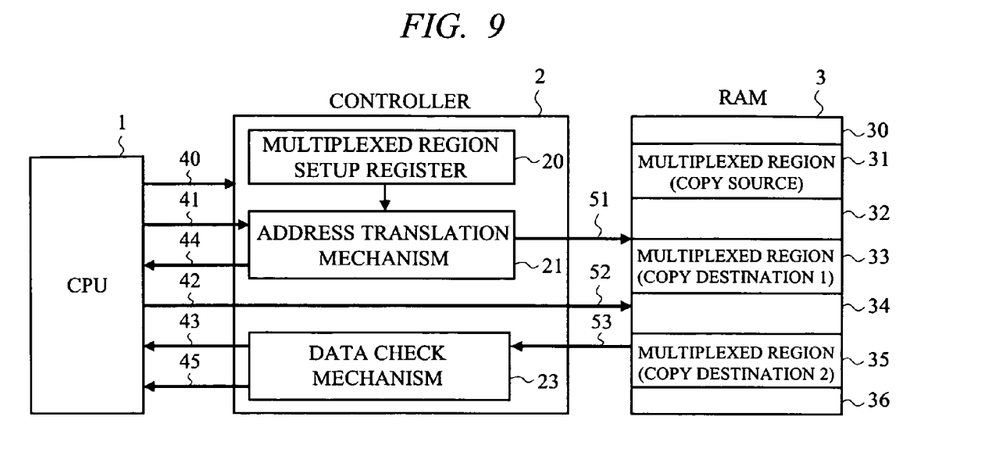
FIG. 9 is a diagram showing a configuration of a microcontroller according to a second embodiment of the invention.

FIG. 9 is a diagram showing the configuration of a microcontroller according to a second embodiment of the present invention. In the second embodiment, as shown in FIG. 9, the RAM that has no error detecting/correcting functions is used and a copy source and two copy destinations for each copy source are provided as multiplexed regions in the RAM, thereby making it possible to perform the error correction.

The second embodiment is different from the above-described first embodiment shown in FIG. 1 in that two multiplexed regions (copy destinations) 33 and 35 are provided in the RAM 3. Further, the multiplexed region setup register 20, the address translation mechanism 21, and the data check mechanism 23 of the controller 2 are different from those in the first embodiment.

Figure 10:
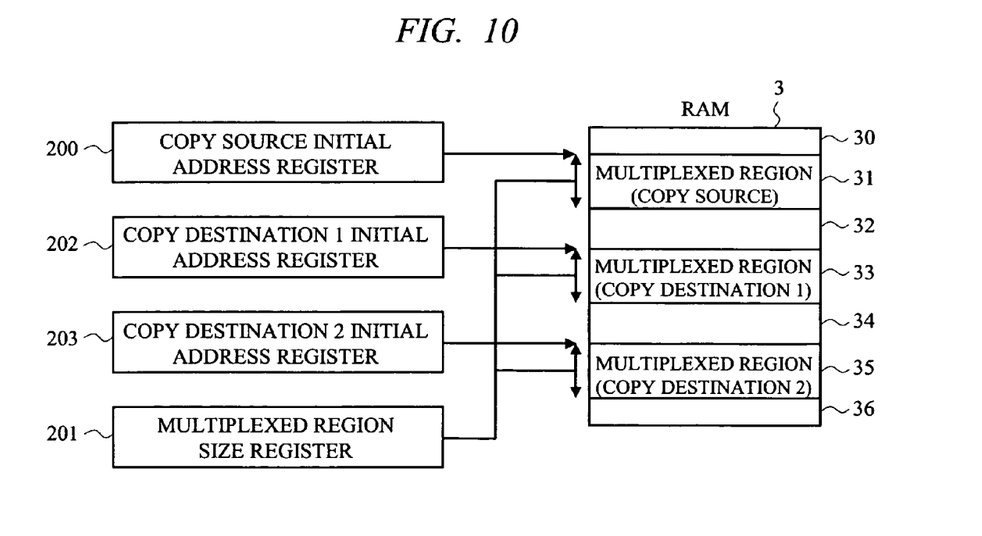
FIG. 10 is a diagram showing a method of setting multiplexed regions in a RAM shown in FIG. 9.

FIG. 10 is a diagram showing a method of setting up the multiplexed regions in the RAM 3 shown in FIG. 9. The multiplexed region setup register 20 of the controller 2 includes the copy source initial address register 200, the multiplexed region size register 201, a copy destination 1 initial address register 202, and a copy destination 2 initial address register 203. FIG. 10 shows an aspect in which the four registers specify the multiplexed regions 31, 33, and 35 of the RAM 3. The copy source initial address register 200 indicates the initial address of the multiplexed region (copy source) 31. The copy destination 1 initial address register 202 indicates the initial address of the multiplexed region (copy destination 1) 33. The copy destination 2 initial address register 203 indicates the initial address of the multiplexed region (copy destination 2) 35. The multiplexed region size register 201 represents the capacities of the multiplexed regions 31, 33, and 35.

The configuration of the address translation mechanism 21 of the second embodiment is different from that shown in FIG. 7 in that two copy destination initial address registers are provided so as to calculate the addresses of the two multiplexed regions (copy destinations 1 and 2). The addresses of the two multiplexed regions (copy destinations 1 and 2) can be calculated by the following formulas 3 and 4.

Multiplexed region (copy destination 1) address=CPU address+copy destination 1 initial address−copy source initial address     formula 3

Multiplexed region (copy destination 2) address=CPU address+copy destination 2 initial address−copy source initial address     formula 4

Figure 11:
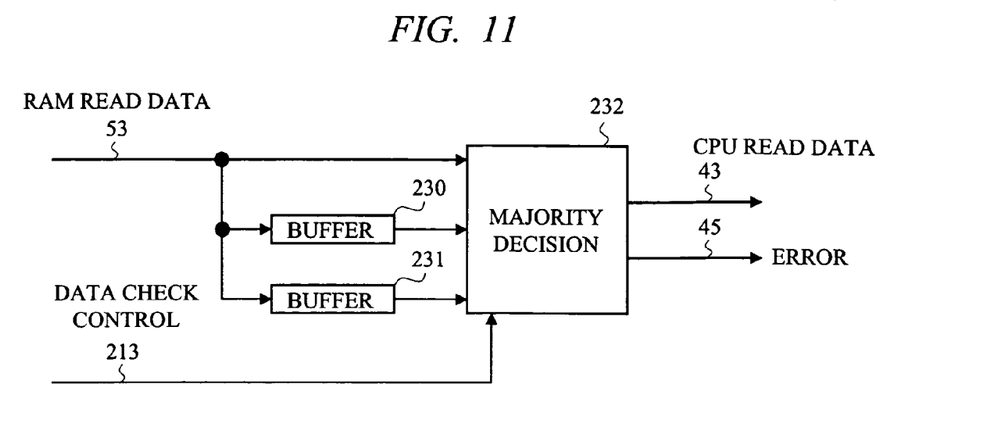
FIG. 11 is a diagram showing a configuration of a data check mechanism shown in FIG. 9.

FIG. 11 is a diagram showing a configuration of the data check mechanism 23 shown in FIG. 9. Reference numerals 230 and 231 denote buffers that store the RAM read data 53. A majority circuit 232 compares the RAM read data 53 and the data stored in the buffer 230 and the buffer 231. When two or more data are matched, the matched data in majority are outputted as the CPU read data 43. When the three data are not matched with one another, the error signal 45 is outputted. The majority decision is made when the data check control signal 213 is enabled. The read data 53 from the multiplexed region (copy source) is stored in the buffer 230. The read data 53 from the multiplexed region (copy destination 1) in the next cycle is stored in the buffer 231. The read data 53 from the multiplexed region (copy destination 2) in the next cycle, the data stored in the buffer 230, the data stored in the buffer 231 are compared in the majority circuit 232. When the three data are not matched with one another, the error signal 45 is outputted.

Figure 12:
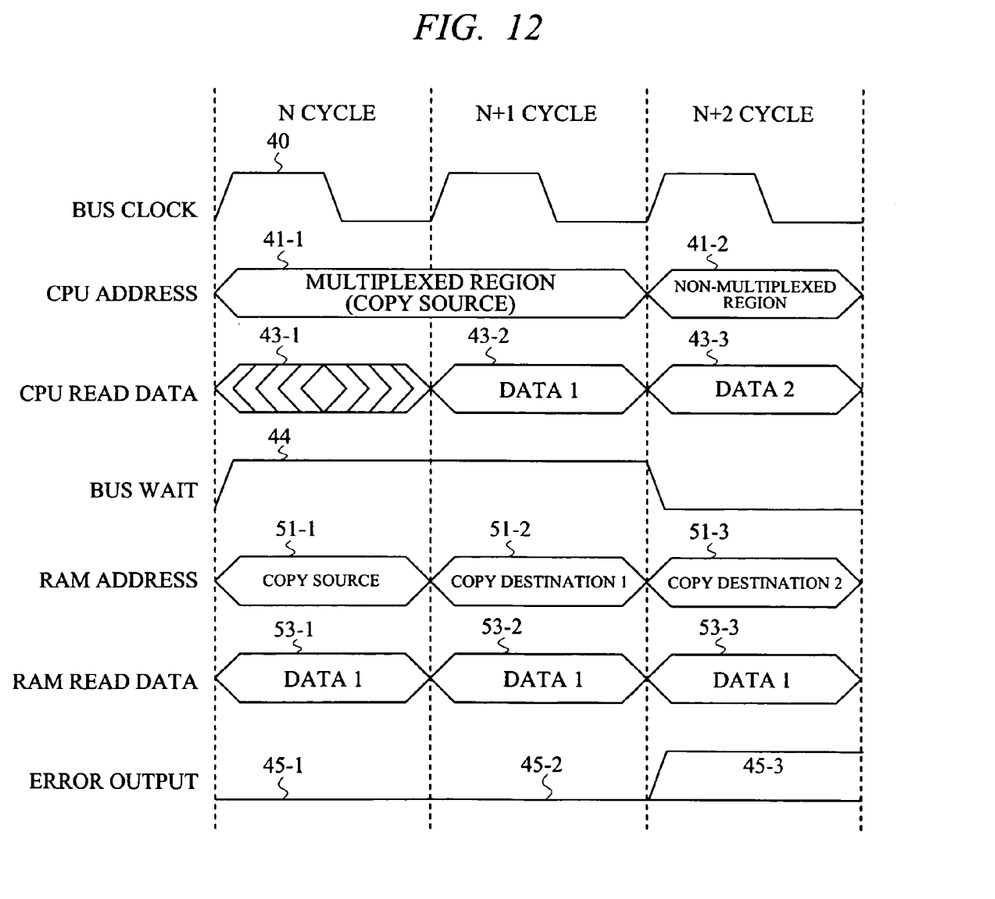
FIG. 12 is a time chart showing reading of data from the regions (copy source, copy destination 1, copy destination 2) of the RAM described with reference to FIG. 11.

FIG. 12 is a time chart showing the reading of data from the multiplexed regions (copy source and copy destinations 1 and 2) of the RAM 3 described with reference to FIG. 11. An N cycle, an N+1 cycle, and an N+2 cycle are cycles in which data is read from the copy source, the copy destination 1, and the copy destination 2, respectively. When the multiplexed region (copy destination 1 or 2) is to be accessed in the next cycle, the bus wait 44 is outputted (in the N cycle or the N+1 cycle). The bus wait 44 makes the access of the CPU 1 wait and the data is read from the multiplexed region (copy destination 1 or 2) (in the N+1 cycle or the N+2 cycle). If the data read from the copy source and the data read from the copy destinations are not matched with one another, an error signal is outputted (45-3).

As described above, according to the second embodiment, not only an advantageous effect similar to that of the above-described first embodiment can be obtained but also further improvement in reliability than the first embodiment can be achieved by comparing the read data based on the majority decision.

Third Embodiment

Figure 13:
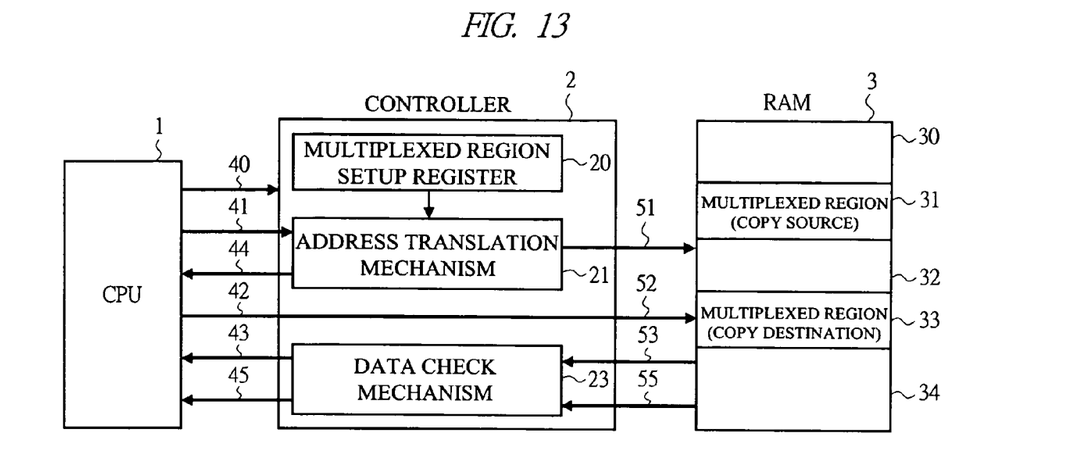
FIG. 13 is a diagram showing a configuration of a microcontroller according to a third embodiment of the invention.

FIG. 13 is a diagram showing an example of a configuration of the microcontroller according to a third embodiment of the present invention. In the third embodiment, as shown in FIG. 13, the RAM that has an error detecting/correcting functions is used and the copy source and the corresponding copy destination are provided as multiplexed regions in the RAM, thereby making it possible to perform the error correction. The RAM 3 has a data bit and a parity bit. When data is read, the RAM 3 performs a parity check and outputs a parity error signal 55.

There are three conceivable methods of reading data from the multiplexed region. In a first method, when no parity error occurs at the time of reading data from the multiplexed region (copy source) 31, the data is outputted as read data 43 to the CPU 1 and the access is completed. In this case, data is not read from the multiplexed region (copy destination). If a parity error occurs at the time of reading data from the multiplexed region (copy source) 31, data is read from the multiplexed region (copy destination) 33. If no parity error occurs, the data is outputted as the read data 43 to the CPU and the access is completed. If a parity error occurs, the error signal 45 is outputted. In a second method, if a parity error occurs at the time of reading data from the multiplexed region (copy source), and if no parity error occurs at the time of reading data from the multiplexed region (copy destination), the data read from the multiplexed region (copy destination) is written back to the multiplexed region (copy source). In a third method, even if no parity error occurs at the time of reading data from the multiplexed region (copy source), as mentioned in the first method, data is read from the multiplexed region (copy destination). If a parity error occurs at that time, the correct data read from the multiplexed region (copy source) is written back to the region where a parity error has occurred, that is, the multiplexed region (copy destination). On these methods, it takes more time in the order of the first, second, and third methods to output the read data. However, the possibility that a data error occurs can be reduced also in this order. In other words, it is possible to select a method of reading data based on the trade off between performance and reliability.

As described above, according to the third embodiment, an advantageous effect similar to that of the first embodiment can be obtained by performing a parity check at the time of reading.

In the foregoing, the invention made by the inventors of the present invention has been concretely described based on the embodiments. However, it is needless to say that the present invention is not limited to the foregoing embodiments and various modifications and alterations can be made within the scope of the present invention.

For example, in the third embodiment, parity is used as an error detection function of the RAM, but ECC can be used as well. ECC can correct a one-bit error and detect a two-bit error. When a two-bit error is detected by ECC, correct data can be read by using the multiplexed region and also the correct data can be written back to the region where the two-bit error has been detected.

In the above-mentioned three embodiments, it is possible to speed up the writing of data to the multiplexed regions. More specifically, a buffer to temporarily store data written to the RAM 3 is provided, and when writing to the multiplexed region (copy source) is completed, the write access by the CPU 1 is completed. Then, during the period until data is written next time, the data in the buffer is written to the multiplexed region (copy destination) at the timing when the CPU 1 does not access the RAM 3. When writing of data from the buffer to the multiplexed region (copy destination) overlaps writing of data from the CPU 1 to the RAM 3, for example, in the case where writing of data to the multiplexed region is performed consecutively, a bus wait is outputted to the CPU 1 so as to make the access to the RAM 3 wait.

It is also possible to speed up the reading when data at the same RAM address is read after the data has been written to a multiplexed region. In this case, the data is read from the buffer for writing data to the multiplexed region instead of reading the data from the RAM 3.

Further, the multiplexed region (copy destination) is not necessarily provided in the RAM in which the multiplexed region (copy source) is provided. By providing another RAM with the same capacity as the multiplexed region so as to be accessed separately from the original RAM, it is possible to perform the access to the multiplexed region at one time. It is also possible to set up the multiplexed region (copy destination) in an external memory. Furthermore, it is possible to set up the multiplexed regions in an external memory and use them.

The above-mentioned embodiments are examples in which the invention is applied to a microcontroller. However, by incorporating the functions of the controller 2 shown in FIG. 1, FIG. 9, and FIG. 13 in an individual memory component, it is possible to form a highly reliable memory such as RAM.

The invention is effectively applied to a microcontroller or memory for use in a control apparatus requiring high reliability.

What is claimed is:

1. A microcontroller comprising:
   a CPU; and
   a RAM for storing data processed by said CPU,
   wherein, at least one region of address spaces specifying said RAM is defined as a multiplexed region, and
   when said multiplexed region is accessed, an access to an address outputted by said CPU and at least one copy access to an address obtained by adding or subtracting a certain value to or from the address outputted by said CPU are performed.

2. The microcontroller according to claim 1, further comprising:
   a register for specifying the multiplexed region of said RAM,
   wherein said register has, as information, an initial address of said multiplexed region, a capacity of said multiplexed region, and a certain value to be added or subtracted to or from the address outputted by said CPU for said copy access.

3. The microcontroller according to claim 1, further comprising:
   a register for specifying the multiplexed region of said RAM,
   wherein said register has, as information, an initial address of said multiplexed region, a capacity of said multiplexed region, and an initial address of the region to which said copy access is performed.

4. The microcontroller according to claim 1,
   wherein, when said multiplexed region is accessed, an access to an address outputted by said CPU and one copy access to an address obtained by adding or subtracting a certain value to or from the address outputted by said CPU are performed,
   at the time of a write access, identical data is written to the address outputted by said CPU and to the address of said copy access, and
   at the time of a read access, data is read from the address outputted by said CPU and from the address of said copy access to perform a check to determine whether values of the read two data are matched, and if matched, the two data are regarded as correct data and outputted as read data and if not matched, an error signal is outputted to said CPU.

5. The microcontroller according to claim 1,
   wherein, when said multiplexed region is accessed, an access to an address outputted by said CPU and two copy accesses to two addresses obtained by adding or subtracting two different values to or from the address outputted by said CPU are performed,
   at the time of a write access, identical data is written to the address outputted by said CPU and to the two addresses of said copy access, and
   at the time of a read access, data is read from the address outputted by said CPU and from the two addresses of said copy access to perform a check to determine whether values of the read data are matched, and if two or more data matched, the matched data are outputted as read data and if all of the three data are not matched, an error signal is outputted to said CPU.

6. The microcontroller according to claim 5,
   wherein, if two data are matched in the read access from said multiplexed region, the matched two data are written back to an address containing the data not matched with the matched two data.

7. The microcontroller according to claim 1,
   wherein said RAM has a parity bit for detecting an error in data,
   when said multiplexed region is accessed, an access to an address outputted by said CPU and one copy access to an address obtained by adding or subtracting a certain value to or from the address outputted by said CPU are performed,
   at the time of a write access, identical data and a parity bit are written to the address outputted by said CPU and to the address of said copy access, and
   at the time of a read access, the data and the parity bit in the address outputted by said CPU are read to perform a parity check, and if a result of the check is correct, the data is outputted as read data and the read access is completed, and if the check result is not correct, the data and the parity bit in the address of said copy access are read to perform a parity check, and if a result of the check is correct, the data is outputted as read data and the read access is completed, and if the check result is not correct, an error signal is outputted to said CPU.

8. The microcontroller according to claim 7,
   wherein, at the time of the read access from said multiplexed region, if the result of the parity check of the data read from the address outputted by said CPU is not correct and if the result of the parity check of the data read from the address of said copy access is correct, the data read from the address of said copy access is written back to the address outputted by said CPU.

9. The microcontroller according to claim 1,
wherein said RAM has a parity bit for detecting an error in data,
when said multiplexed region is accessed, an access to an address outputted by said CPU and one copy access to an address obtained by adding or subtracting a certain value to or from the address outputted by said CPU are performed,
at the time of a write access, identical data and a parity bit are written to the address outputted by said CPU and to the address of said copy access, and
at the time of a read access, both the data and the parity bit in the address outputted by said CPU and the data and the parity bit in the address of said copy access are read to perform parity checks, and if at least one of results of the checks is correct, the data whose parity check result is correct is outputted as read data and is written back to the address containing the data whose parity check result is not correct and the read access is completed, and if none of the check results is correct, an error signal is outputted to said CPU.

10. The microcontroller according to claim 1,
wherein said RAM has an error correcting code (ECC) bit for detecting and correcting an error in data,
when said multiplexed region is accessed, an access to an a address outputted by said CPU and one copy access to an address obtained by adding or subtracting a certain value to or from the address outputted by said CPU are performed,
at the time of a write access, identical data and the ECC bit are written to the address outputted by said CPU and to the address of said copy access, and
at the time of a read access, the data and the ECC bit in the address outputted by said CPU are read to perform an error correction, and if the data is correct or the data can be corrected, the data is outputted as read data and the read access is completed, and if the data is not correct, the data and the ECC bit in the address of said copy access are read to perform an error correction, and if the data is correct or the data can be corrected, the data is outputted as read data and the read access is completed, and if the data cannot be corrected, an error signal is outputted to said CPU.

11. The microcontroller according to claim 10,
wherein, at the time of the read access from said multiplexed region, if the data in the address outputted by said CPU cannot be corrected by the ECC and the data in the address of said copy access is correct or an error in the data can be corrected by the ECC, the data in the address of said copy access is written back to the address outputted by said CPU.

12. The microcontroller according to claim 1,
wherein said RAM has an ECC bit for detecting and correcting an error in data,
when said multiplexed region is accessed, an access to an address outputted by said CPU and one copy access to an address obtained by adding or subtracting a certain value to or from the address outputted by said CPU are performed,
at the time of a write access, identical data and the ECC bit are written to the address outputted by said CPU and to the address of said copy access, and
at the time of a read access, both the data and the ECC bit in the address outputted by said CPU and the data and the ECC bit in the address of said copy access are read to perform an error correction, and if at least one of the read data is correct or the error can be corrected, the data is outputted as read data and is written back to the address containing the data whose error cannot be corrected and the read access is completed, and if none of errors in the data can be corrected, an error signal is outputted to said CPU.

13. The microcontroller according to claim 12, further comprising:
a buffer for temporarily storing data written to said multiplexed region,
wherein an access to said multiplexed region is completed by writing data to the address outputted by said CPU and writing the data to said buffer, and
the data in said buffer is written to the address of said copy access.

14. The microcontroller according to claim 13,
wherein, when data is written to said multiplexed region and then the data is read from the same address, the data is not read from said RAM but read from said buffer.

15. The microcontroller according to claim 14,
wherein a copy access to said multiplexed region is performed to an external memory of said microcontroller.

16. The microcontroller according to claim 12, further comprising:
a copy-only RAM having an identical capacity to that of said multiplexed region in addition to said RAM,
wherein, when said multiplexed region is accessed, said copy-only RAM is also accessed simultaneously.

17. A RAM,
wherein at least one region of address spaces is defined as a multiplexed region, and
when said multiplexed region is accessed, an access to an address outputted by said CPU and at least one copy access to an address obtained by adding or subtracting a certain value to or from the address outputted by said CPU are performed.

18. The RAM according to claim 17, further comprising:
a register for specifying said multiplexed region,
wherein said register has, as information, an initial address of said multiplexed region, a capacity of said multiplexed region, and a certain value to be added or subtracted to or from the address outputted by said CPU for said copy access.

19. The RAM according to claim 18, further comprising:
a register for specifying said multiplexed region,
wherein said register has, as information, an initial address of said multiplexed region, a capacity of said multiplexed region, and an initial address of said copy access.

* * * * *